(12) United States Patent
Komiyama et al.

(10) Patent No.: US 10,884,690 B2
(45) Date of Patent: Jan. 5, 2021

(54) DUAL SCREEN DEVICE HAVING POWER STATE INDICATORS

(71) Applicant: Lenovo (Singapore) Pte. Ltd., Singapore (SG)

(72) Inventors: Hirohide Komiyama, Kanagawa-ken (JP); Yasumichi Tsukamoto, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 41 days.

(21) Appl. No.: 15/177,014

(22) Filed: Jun. 8, 2016

(65) Prior Publication Data

US 2016/0371046 A1 Dec. 22, 2016

(30) Foreign Application Priority Data

Jun. 19, 2015 (JP) ................................. 2015-124210

(51) Int. Cl.
| | | |
|---|---|---|
| *G06F 3/041* | (2006.01) | |
| *G06F 3/14* | (2006.01) | |
| *G06F 1/16* | (2006.01) | |
| *G06F 3/0488* | (2013.01) | |
| *G09G 5/34* | (2006.01) | |

(52) U.S. Cl.
CPC .......... *G06F 3/1423* (2013.01); *G06F 1/1618* (2013.01); *G06F 1/1647* (2013.01); *G06F 3/041* (2013.01); *G06F 3/04883* (2013.01); *G06F 3/1446* (2013.01); *G06F 2203/04808* (2013.01); *G09G 5/346* (2013.01); *G09G 2300/026* (2013.01); *G09G 2340/0492* (2013.01); *G09G 2354/00* (2013.01)

(58) Field of Classification Search
CPC ................. G06F 1/1618; G06F 1/1647; G06F 2203/04808; G06F 3/041; G06F 3/04883; G06F 3/1423; G06F 3/1446; G09G 2300/026; G09G 2340/0492; G09G 2354/00; G09G 5/346
See application file for complete search history.

(56) References Cited

U.S. PATENT DOCUMENTS 8,677,284 B2 * 3/2014 Aguilar ............... G06F 3/04815
715/830
2006/0034042 A1 * 2/2006 Hisano .................. G06F 1/1616
361/679.04

(Continued)

FOREIGN PATENT DOCUMENTS

| JP | H09305262 A | 11/1997 |
|---|---|---|
| JP | 2010140410 A | 6/2010 |

(Continued)

*Primary Examiner* — Ram A Mistry
(74) *Attorney, Agent, or Firm* — Ference & Associates LLC

(57) ABSTRACT

An embodiment provides a portable computing device including: a first chassis provided with a first touch display unit; a second chassis provided with a second touch display unit; a coupling part which rotatably couples the first chassis and the second chassis to each other; and control unit which displays screen state information indicating a display state of one or more of the first touch display unit and the second touch display unit on one or more of the first touch display unit and the second touch display unit. Other aspects are described and claimed.

20 Claims, 14 Drawing Sheets

(56) References Cited

U.S. PATENT DOCUMENTS

2010/0321275 A1* 12/2010 Hinckley ............... G06F 1/1618
 345/1.3
2011/0039605 A1* 2/2011 Choi .................... H02J 7/0047
 455/573

FOREIGN PATENT DOCUMENTS

| JP | 2011232843 A | 11/2011 |
| JP | 2012138656 A | 7/2012 |
| JP | 2013011931 A | 1/2013 |
| JP | 2013546045 A | 12/2013 |
| JP | 2014003349 A | 1/2014 |
| WO | 2011118217 A1 | 9/2011 |

* cited by examiner

CLOSED STATE
$\theta = 0°$

BOOK STATE
$0° < \theta < 180°$

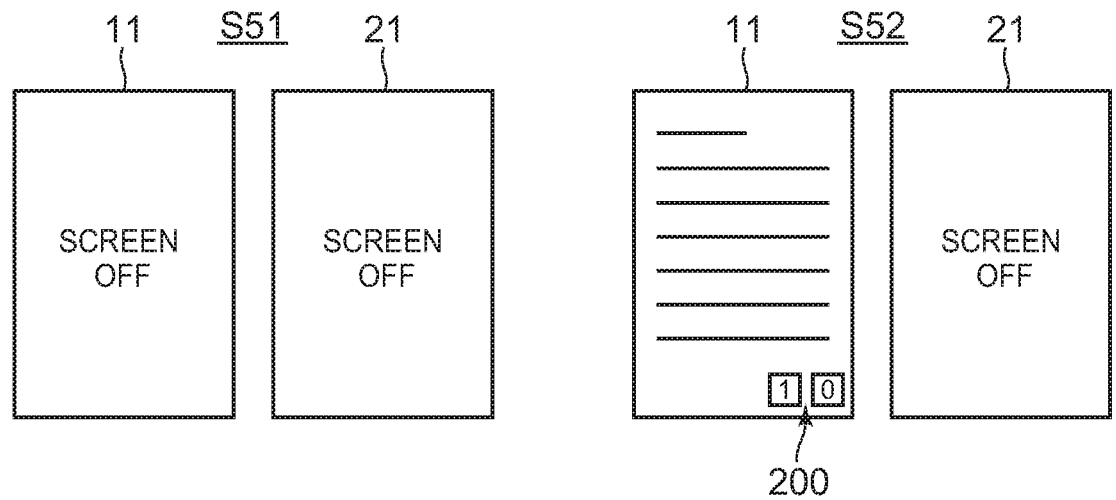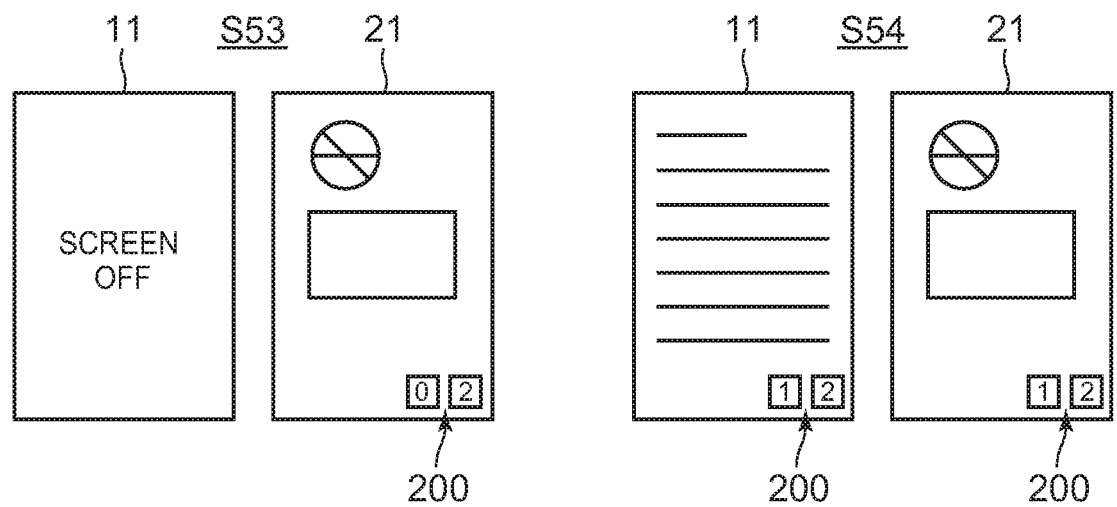
FIG. 4

|  | COLUMN → | $Y_7$ AFTER | $Y_8$ | $Y_9$ | $Y_{10}$ | $Y_{11}$ |
|---|---|---|---|---|---|---|
| ROW ↓ | BEFORE | | | | | |
| $X_1$ | | 1  0<br>LS | 0  2<br>    L | 2  2<br>L  L | 2  0<br>L | 2  0<br>LS |
| $X_2$ | A | 1  0<br>LS | 1  2<br>VL  L | 2  2<br>L  L | 2  0<br>L | 2  0<br>LS |
| $X_3$ | A A | 1  0<br>LS | 1  2<br>VL  L | 2  2<br>L  L | 2  1<br>L  VL | 2  0<br>LS |
| $X_4$ | A B | 1  0<br>LS | 1  0/2<br>VL  L | 2  2<br>L  L | 2  2<br>L  VL | 2  0<br>LS |
| $X_5$ | B A | 1  0<br>LS | 2  2<br>VL  L | 0/2  2<br>L  L | 0/2  1<br>L  VL | 2  0<br>LS |
| $X_6$ | A | 1  0<br>LS | 0  2<br>    L | 2  2<br>L  L | 2  1<br>L  VL | 2  0<br>LS |
| $X_7$ | | NA | 1  2<br>L  L | 2  2<br>L  L | 2  1<br>L  VL | 2  0<br>LS |
| $X_8$ | B | 1  0<br>LS | NA | 2  0/2<br>L  L | 2  2<br>L  VL | 2  0<br>LS |
| $X_9$ | B B | 1  0<br>LS | 2  0/2<br>VL  L | NA | 0/2  2<br>L  VL | 2  0<br>LS |
| $X_{10}$ | B | 1  0<br>LS | 2  2<br>VL  L | 0/2  2<br>L  L | NA | 2  0<br>LS |
| $X_{11}$ | <br>11 21 | 1  0<br>LS | 2  2<br>VL  L | 2  2<br>L  L | 2  2<br>L  VL | NA |

FIG. 5B

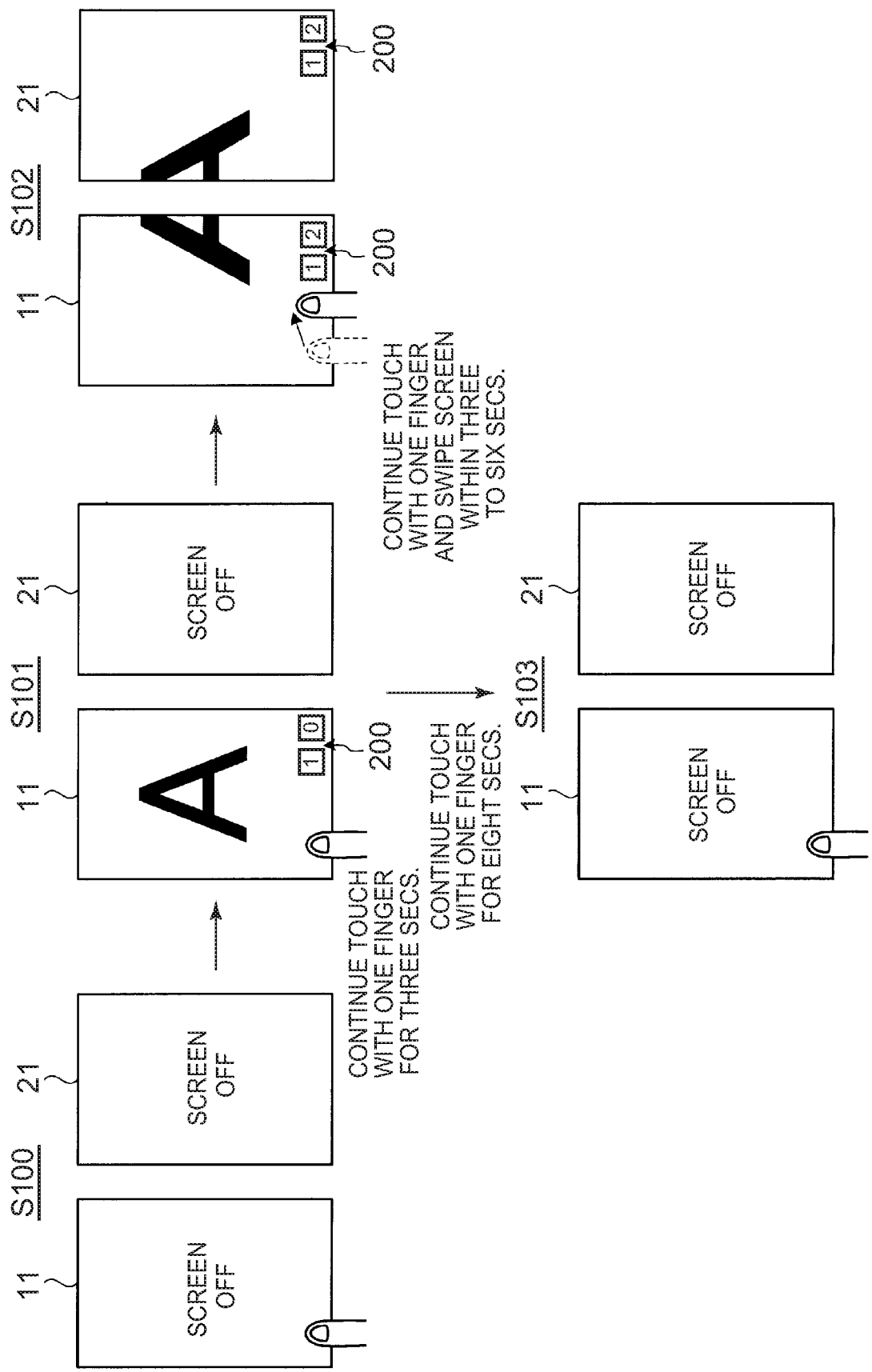

DUAL SCREEN DEVICE HAVING POWER STATE INDICATORS

CROSS REFERENCE TO RELATED APPLICATIONS

This application claims priority to Japanese Patent Application Serial No. 2015-124210, filed on 19 Jun. 2015, the contents of which are incorporated by reference herein.

FIELD

The subject matter relates to a portable computing device, a screen switching method therefor, and a computer-executable program therefor.

BACKGROUND

Recently a type of portable computing device with two screens has spread in the field of a portable computing device such as a smartphone or a laptop PC. The portable computing device with two screens has a configuration in which a first chassis with a first screen disposed thereon is rotatably coupled to a second chassis with a second screen disposed thereon, where the second chassis is rotatable substantially 360 degrees with respect to the first chassis. The portable computing device with two screens is allowed to have various configurations such as a closed configuration in which the first screen and the second screen are opposed to each other with both facing inward, a basic configuration in which the first screen and the second screen are opposed to each other with both facing outward, a tablet configuration, a tent configuration, a book configuration, and the like.

For example, a user is not able to directly and visually recognize the display state of the opposite screen in the portable computing device with two screens in some cases depending on the configuration thereof (for example, in the case of the tent configuration, the basic configuration, or the like). In the case where the opposite screen displays an image that the user does not want to show to others or the like cases, the user is placed in an undesirable situation. Therefore, it is desired to improve usability by enabling the user to easily check the display state or the like of the other screen by viewing one screen.

Moreover, while a portable computing device with one screen is able to switch the content of the screen relatively easily, it is also desired to improve the usability of the portable computing device with two screens by enabling the portable computing device with two screens to switch easily between the states of the two screens.

BRIEF SUMMARY

In summary, one embodiment provides a portable computing device comprising: a first chassis provided with a first touch display unit; a second chassis provided with a second touch display unit; a coupling part which rotatably couples the first chassis and the second chassis to each other; and control unit which displays screen state information indicating a display state of one or more of the first touch display unit and the second touch display unit on one or more of the first touch display unit and the second touch display unit.

Another embodiment provides a method, comprising: displaying screen state information for a portable computing device in which a first chassis provided with a first touch display unit is rotatably coupled to a second chassis provided with a second touch display unit; and indicating a display state of one or more of the first touch display unit and the second touch display unit on one of the first touch display unit and the second touch display unit.

A further embodiment provides a computer program product, comprising: a computer readable storage device storing code that is executable by a processor and comprises: code that displays screen state information for a portable computing device in which a first chassis provided with a first touch display unit is rotatably coupled to a second chassis provided with a second touch display unit; and code that indicates a display state of one or more of the first touch display unit and the second touch display unit on one of the first touch display unit and the second touch display unit.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the embodiments will be pointed out in the appended claims

BRIEF DESCRIPTION OF THE SEVERAL VIEWS OF THE DRAWINGS

FIG. 4 is a diagram for describing a display example of screen state information.

FIG. 5B is a diagram illustrating a matrix for describing an example of screen switching processing.

FIG. 6 is a diagram for describing an example of a user's operation and an example of screen displays for the screen switching processing.

DETAILED DESCRIPTION

Figure 1:
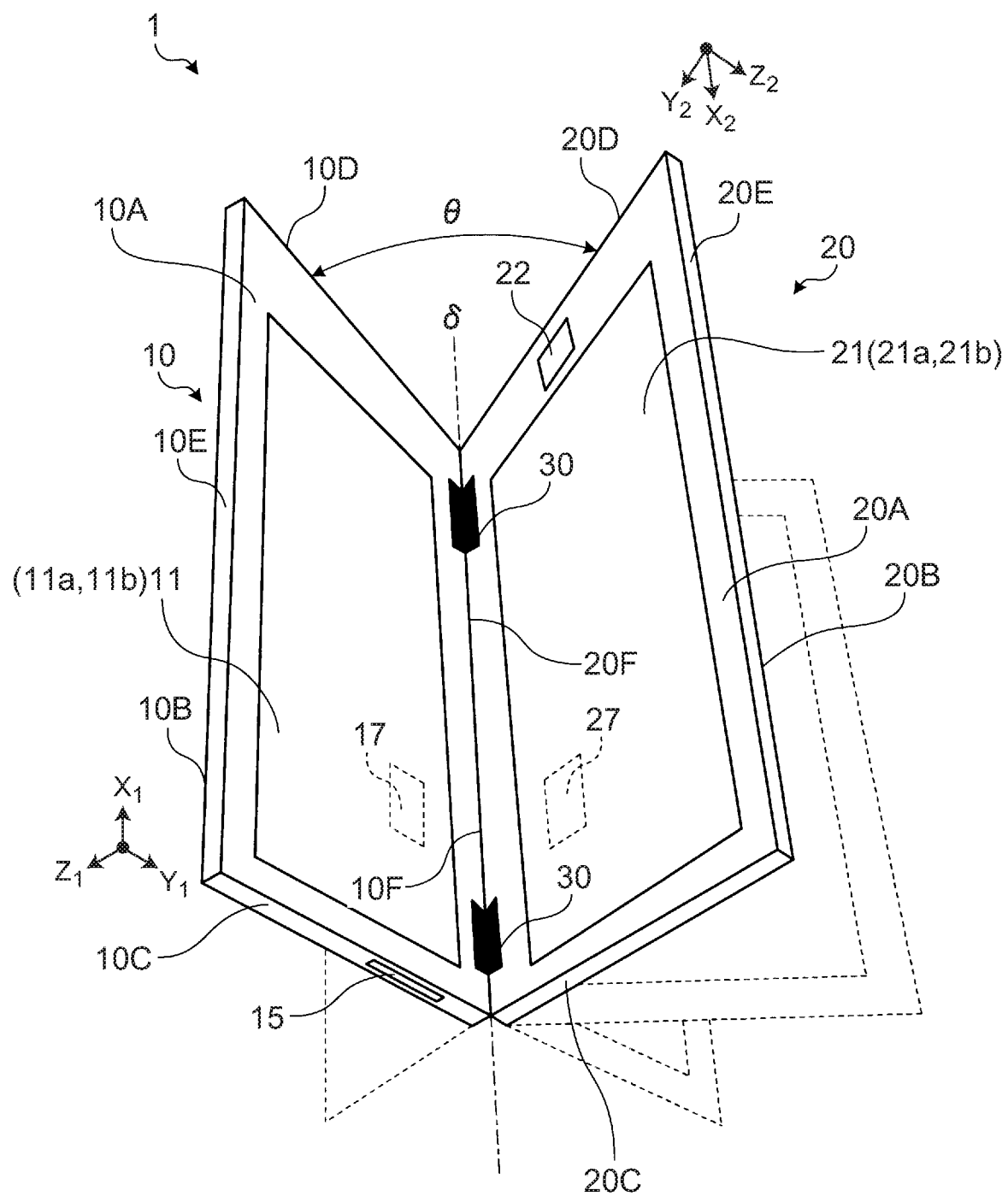
FIG. 1 is a perspective view illustrating the appearance configuration of a portable computing device according to the present embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides a portable computing device with two screens capable of improving usability of the two screens, a screen switching method therefor, and a computer-executable program therefor.

An embodiment includes: a first chassis provided with a first touch display unit; a second chassis provided with a second touch display unit; a coupling part which rotatably couples the first chassis and the second chassis to each other; and control means which displays screen state information indicating a display state of a screen of the other touch display unit on the first touch display unit and the second touch display unit.

Furthermore, according to an aspect, the control means displays the screen state information in the case where an angle θ of the second chassis with respect to the first chassis satisfies 180 degrees<θ≤360 degrees.

Furthermore, according to an aspect, the screen state information includes information indicating turning on or off of the screen.

Furthermore, according to an aspect, the screen state information includes information indicating a display content of the screen.

Furthermore, according to an aspect, the control means switches the state of the screen of at least one of the first touch display unit and the second touch display unit according to an input operation on at least one of the first touch display unit and the second touch display unit.

Furthermore, according to an aspect, the switching of the state of the screen includes at least one of turning on of the screen, turning off of the screen, and display screen switching.

Furthermore, according to an aspect, the control means selects the content of the screen to be switched based on the number of fingers touching at least one of the first touch display unit and the second touch display unit.

Furthermore, according to an aspect, the control means switches the display to a primary screen or a secondary screen based on the number of fingers touching at least one of the first touch display unit and the second touch display unit.

Furthermore, according to an aspect, the control means switches the display to the screen displayed on the first touch display unit or to the screen displayed on the second touch display unit based on the number of fingers touching at least one of the first touch display unit and the second touch display unit.

Furthermore, according to an aspect, the control means displays the same screen on the first touch display unit and the second touch display unit in the case where a first input operation is performed on at least one of the first touch display unit and the second touch display unit.

Furthermore, according to an aspect, the control means performs two-screen display on the first touch display unit and the second touch display unit in the case where a second input operation is performed on at least one of the first touch display unit and the second touch display unit.

Moreover, an embodiment provides a screen switching method for a portable computing device in which a first chassis provided with a first touch display unit is rotatably coupled to a second chassis provided with a second touch display unit, the method including the step of displaying screen state information indicating a display state of a screen of the other touch display unit on the first touch display unit and the second touch display unit.

Furthermore, according to an aspect, the screen switching method further includes the step of switching the state of the screen of at least one of the first touch display unit and the second touch display unit according to an input operation on at least one of the first touch display unit and the second touch display unit.

Moreover, an embodiment provides a program installed in a portable computing device in which a first chassis provided with a first touch display unit is rotatably coupled to a second chassis provided with a second touch display unit, the program causing a computer to perform the step of displaying screen state information indicating a display state of a screen of the other touch display unit on the first touch display unit and the second touch display unit.

Furthermore, according to an aspect, the program further causes the computer to perform the step of switching the state of the screen of at least one of the first touch display unit and the second touch display unit according to an input operation on at least one of the first touch display unit and the second touch display unit.

According to an embodiment, a portable computing device with two screens is able to improve usability of the two screens advantageously.

The following describes a portable computing device, a screen switching method therefor, and a computer-executable program therefor according to an embodiment in detail with reference to accompanying drawings. Although the constituent elements of the embodiments are generally illustrated in the drawings of the present specification, it is easily understood that the constituent elements may be widely and variously arranged and designed in various configurations. Therefore, the following more detailed description of the embodiments of the device, system, and method is not intended to limit the scope of the appended claims, and it is provided to show merely examples of selected embodiments and to simply show the selected embodiments of the device, system, and method without inconsistency with the claims of the present specification. One skilled in the art will recognize that the embodiments can be practiced without one or more of the specific details, or with other methods, components, or materials. In addition, the order of performing the steps of the flowchart is not limited to the order illustrated in the flowchart, but the order may be modified without departing from the spirit of the disclosure. It should be noted that the embodiments do not limit the claims.

Figure 2A:
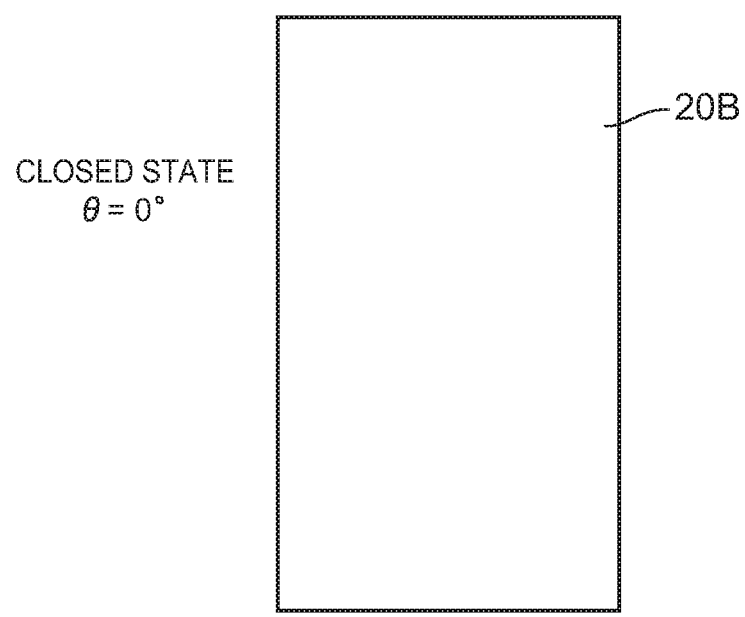
FIG. 2A is a diagram for describing various states of a portable computing device 1 and is a diagram illustrating a closed state.
Figure 2B:
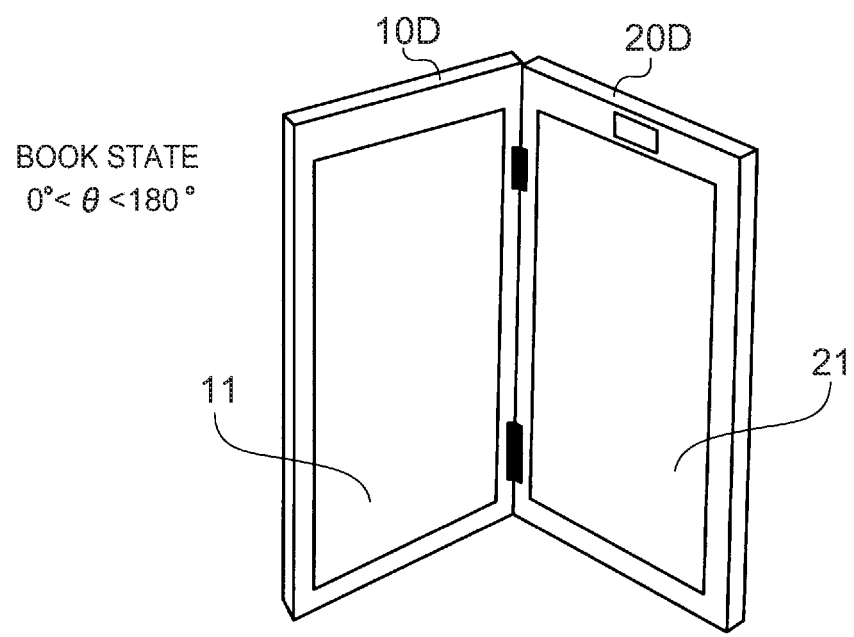
FIG. 2B is a schematic diagram for describing various states of the portable computing device and is a diagram illustrating a book state.
Figure 2C:
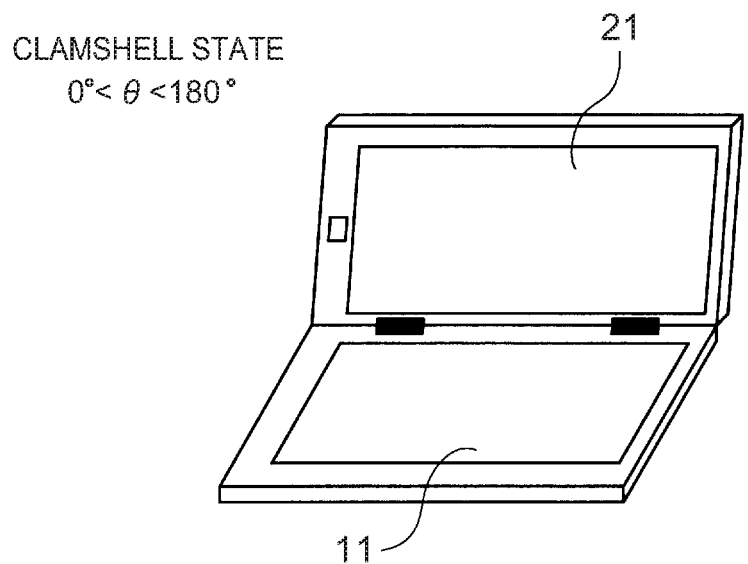
FIG. 2C is a schematic diagram for describing various states of the portable computing device and is a diagram illustrating a clamshell state.
Figure 2D:
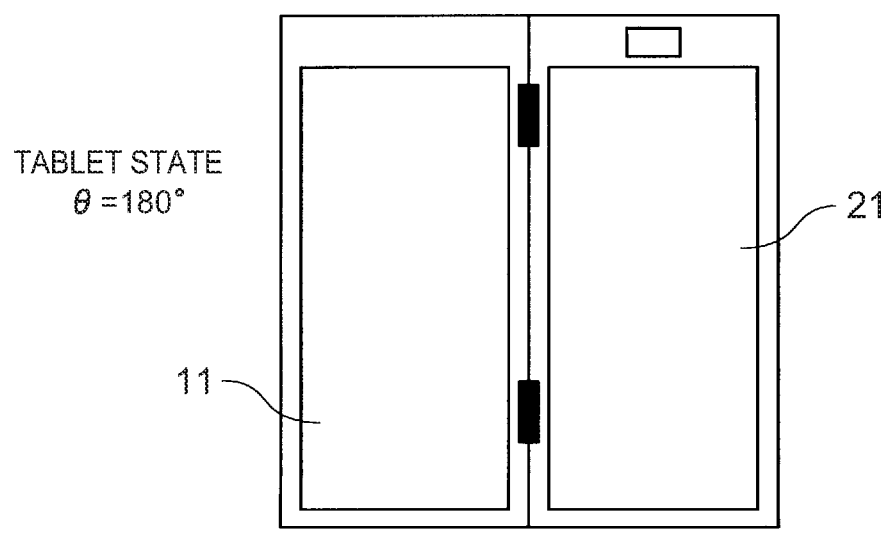
FIG. 2D is a schematic diagram for describing various states of the portable computing device and is a diagram illustrating a tablet state.
Figure 2E:
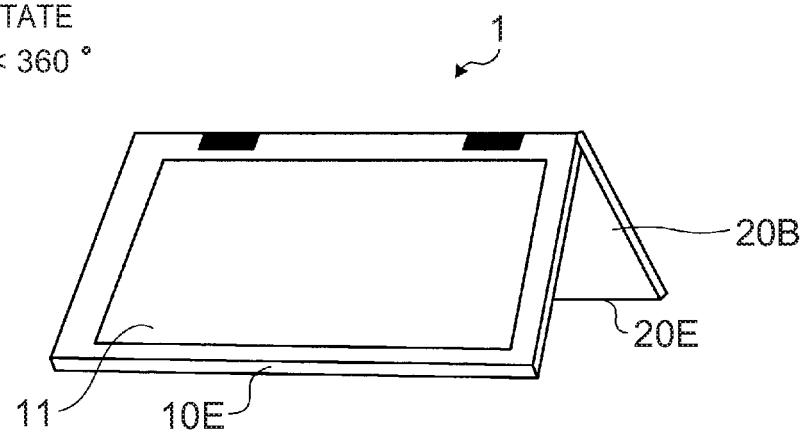
FIG. 2E is a schematic diagram for describing various states of the portable computing device and is a diagram illustrating a tent state.
Figure 2F:
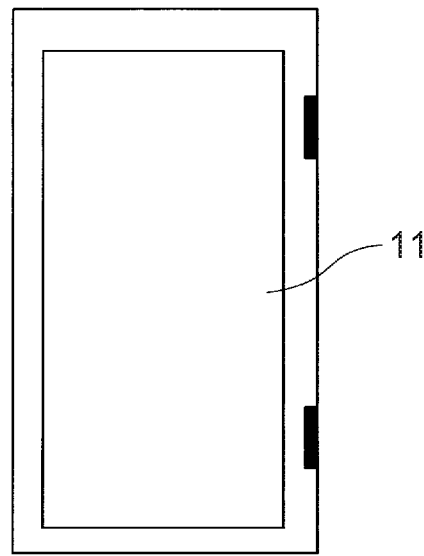
FIG. 2F is a schematic diagram for describing various states of the portable computing device and is a diagram illustrating a basic state.
Figure 3:
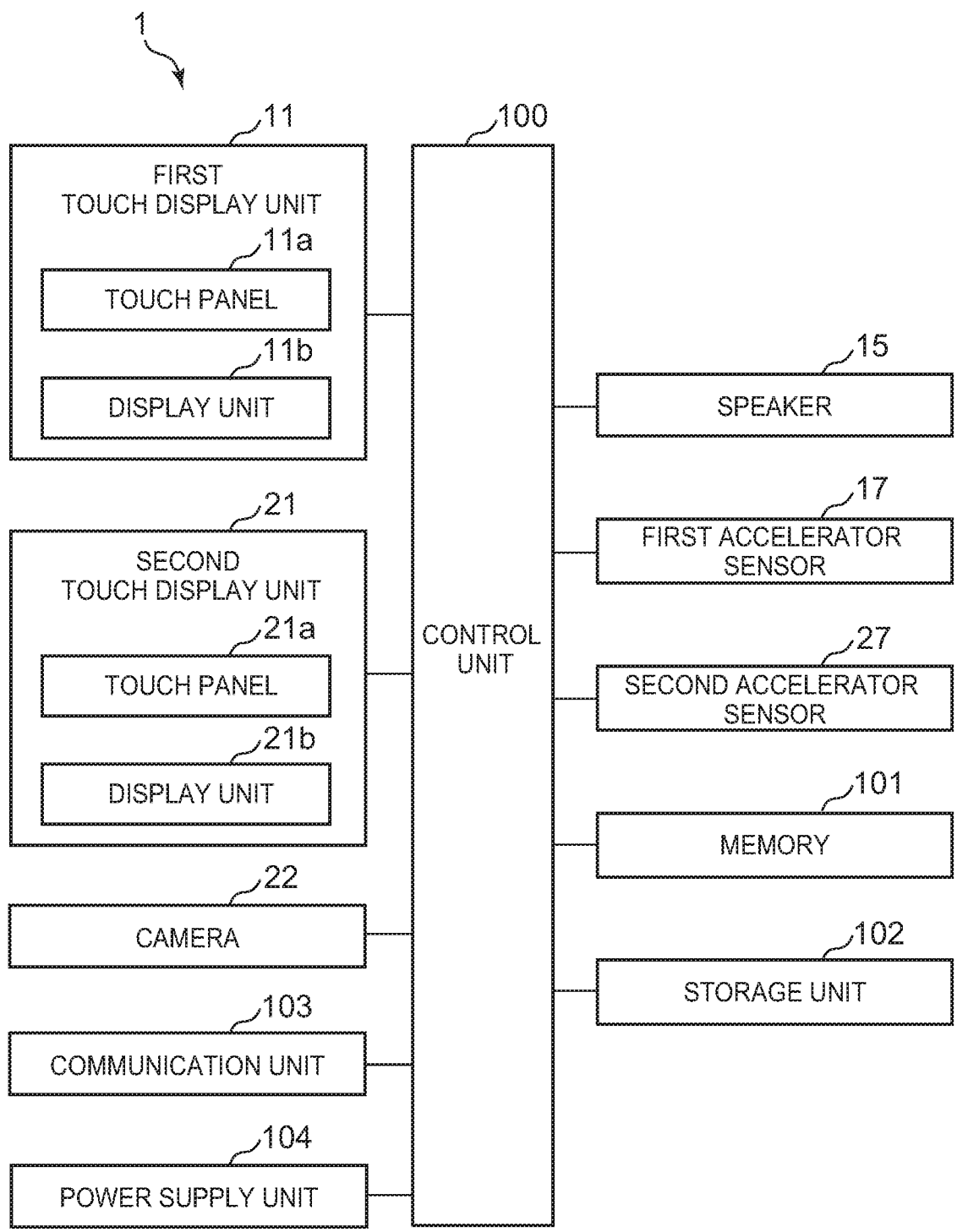
FIG. 3 is a block diagram illustrating the portable computing device.

Referring to FIGS. 1 to 3, the configuration of the portable computing device according to an embodiment will be described. The portable computing device according to an embodiment is a portable computing device with two displays such as, for example, a laptop PC, a tablet, a smartphone, a phablet, or the like.

FIG. 1 is a perspective view illustrating the appearance configuration of the portable computing device according to an embodiment. The portable computing device 1 includes a first chassis 10 and a second chassis 20. Furthermore, the portable computing device 1 includes a hinge (coupling part) 30 between the first chassis 10 and the second chassis 20.

The hinge 30 rotatably couples the first chassis 10 and the second chassis 20 to each other. An angle between the first chassis 10 and the second chassis 20 relative to a rotation axis δ is defined as "θ." More specifically, the hinge 30 couples the first chassis 10 and the second chassis 20 to each other so as to be rotatable substantially 360 degrees around the rotation axis δ. The portable computing device 1 is able to be placed in various states through the hinge 30.

The first chassis 10 includes a first touch display unit 11, a speaker 15, a first accelerator sensor 17, and a circuit board (not illustrated). The first chassis 10 is substantially rectangular and has a first surface 10A on which the first touch display unit 11 is disposed, a second surface 10B which is opposed to the first surface 10A, side surfaces 10C and 10D which extend along the transverse direction and are opposed to each other, and side surfaces 10E and 1 OF which extend along the longitudinal direction and are opposed to each other.

The first touch display unit 11 is disposed substantially in the center of the first surface 10A. The first touch display unit 11 has a display unit 11b and a touch panel 11a superimposed on the display unit 11b. The first touch display unit 11 displays information such as characters, graphics, images, and the like on the display unit 11b and detects various operations performed on the touch panel 11a by using a finger, a stylus, a pen, or the like (hereinafter, referred to as "indicator"). An electrostatic capacitance type, a pressure sensitive type, or the like can be adopted as a method in which the touch panel 11a detects various operations.

The speaker 15 is disposed on the side surface 10C mutually closed thereto. The first accelerator sensor 17 is disposed in the inside of the first chassis 10 to detect acceleration in the $X_1$ direction parallel to the longitudinal direction, in the $Y_1$ direction parallel to the transverse direction, and in the $Z_1$ direction perpendicular to the $X_1$ and $Y_1$ directions, with respect to the first touch display unit 11 (the first surface 10A). The first accelerator sensor 17 detects the acceleration in the $X_1Y_1Z_1$ directions, thereby enabling the orientation of the first touch display unit 11 to be detected as described later.

The second chassis 20 includes a second touch display unit 21, a camera 22, a second accelerator sensor 27, and a circuit board (not illustrated).

The second chassis 20 is substantially rectangular and has a first surface 20A on which the second touch display unit 21 and the camera 22 are disposed, a second surface 20B which is opposed to the first surface 20A, side surfaces 20C and 20D which extend along the transverse direction and are opposed to each other, and side surfaces 20E and 20F which extend along the longitudinal direction and are opposed to each other.

The second touch display unit 21 is disposed substantially in the center of the first surface 20A. The second touch display unit 21 includes a display unit 21b and a touch panel 21a superimposed on the display unit 21a. The second touch display unit 21 displays information such as characters, graphics, images, and the like on the display unit 21b and detects various operations performed on the touch panel 21a by using a finger, a stylus, a pen, or the like (hereinafter, referred to as "indicator"). An electrostatic capacitance type, a pressure sensitive type, or the like can be adopted as a method in which the touch panel 21a detects various operations.

The camera 22 is disposed in the upper part of the touch display unit 21 of the first surface 20A. The camera 22 performs imaging processing according to a user's operation and generates still image data or moving image data.

The second accelerator sensor 27 is disposed in the inside of the second chassis 20 to detect acceleration in the $X_2$ direction parallel to the longitudinal direction, in the $Y_2$ direction parallel to the transverse direction, and in the $Z_2$ direction perpendicular to the $X_2$ and $Y_2$ directions, with respect to the second touch display unit 21. The second accelerator sensor 27 detects the acceleration in the $X_2Y_2Z_2$ directions, thereby enabling the orientation of the second touch display unit 21 to be detected as described later.

FIGS. 2A to 2F are schematic diagrams for describing various states of the portable computing device 1. The portable computing device 1 is able to adopt various configurations defined by the orientations of the first touch display unit 11 (the first surface 10A of the first chassis 10) and the second touch display unit 21 (the first surface 20A of the second chassis 20).

FIG. 2A illustrates a closed state where the first touch display unit 11 and the second touch display unit 21 are opposed to each other with both facing inward where the angle θ=0 degree.

FIG. 2B illustrates a book state where the side surface 10D of the first touch display unit 11 and the side surface 20D of the second touch display unit 21 are located on the upper side generally in the vertical direction where 0 degree<θ<180 degrees.

FIG. 2C illustrates a clamshell state where the first touch display unit 11 or the second touch display unit 12 is generally horizontal where 0 degree<θ<180 degrees.

FIG. 2D illustrates a tablet state where the first touch display unit 11 and the second touch display unit 21 are generally flush with each other where θ=180 degrees.

FIG. 2E illustrates a tent state where the side surface 10E of the first touch display unit 11 and the side surface 20E of the second touch display unit 21 are located on the lower side generally in the vertical direction where 180 degrees<θ<360 degrees.

FIG. 2F illustrates a basic state where the first touch display unit 11 and the second touch display unit 21 are opposed to each other with both facing outward where angle θ=360 degrees.

FIG. 3 is a rough block diagram of the portable computing device 1. As illustrated in FIG. 3, the portable computing device 1 includes a first touch display unit 11, a second touch display unit 21, a speaker 15, a first accelerator sensor 17, a second accelerator sensor 27, a control unit 100, a memory 101, a storage unit 102, a communication unit 103, and a power supply unit 104.

The second touch display unit 11 has a display unit 11b and a touch panel 11a superimposed on the display unit 11b. The touch panel 11a detects various operations performed on the touch panel 11a by using an indicator such as a finger, a pen, or the like along with the positions on the touch panel 11a in the area where the operations have been performed and notifies the control unit 100. The operations detected by the touch panel 11a include a touch operation, a sliding operation, and a pitch operation. The display unit 11b is formed of, for example, a liquid crystal display (LCD), an organic electro-luminescence (EL) panel, or the like and displays characters, graphics, and the like according to the control of the control unit 100.

The second touch display unit 21 has a display unit 21b and a touch panel 21a superimposed on the display unit 21b. The touch panel 21a detects various operations performed on the touch panel 21a by using an indicator such as a finger, a pen, or the like along with the positions on the touch panel 21a in the area where the operations have been performed and notifies the control unit 100. The operations detected by the touch panel 21a include a touch operation, a sliding operation, and a pitch operation. The display unit 21b is formed of, for example, a liquid crystal display (LCD), an organic electro-luminescence (EL) panel, or the like and displays characters, graphics, and the like according to the control of the control unit 100.

The communication unit 103 is for use in performing data communication with the outside via a network or directly by wire or wirelessly according to the control of the control unit 100.

The speaker 15 operates according to the control of the control unit 100 and outputs a voice signal transmitted from the control unit 100 as voice. The camera 22 outputs image data obtained by imaging a subject to the control unit 100. The power supply unit 104 supplies electric power obtained from a rechargeable battery or an AC adapter to the respective units of the portable computing device 1 including the control unit 100 according to the control of the control unit 100.

The first accelerator sensor 17 detects acceleration in the $X_1$ direction parallel to the longitudinal direction, in the $Y_1$ direction parallel to the transverse direction, and in the $Z_1$ direction perpendicular to the $X_1$ and $Y_1$ directions, with respect to the first touch display unit 11 and outputs acceleration values $Ax_1(t)$, $Ay_1(t)$, and $Az_1(t)$ in the $X_1Y_1Z_1$ directions to the control unit 100.

The second accelerator sensor 27 detects acceleration in the $X_2$ direction parallel to the longitudinal direction, in the $Y_2$ direction parallel to the transverse direction, and in the $Z_2$ direction perpendicular to the $X_2$ and $Y_2$ directions, with respect to the second touch display unit 21 and outputs acceleration values $Ax_2(t)$, $Ay_2(t)$, and $Az_2(t)$ in the $X_2Y_2Z_2$ directions to the control unit 100.

The memory 101 is formed of, for example, a RAM, a DRAM, or the like and is used as a work area where a program executed by the control unit 100, data referenced by the control unit 100, an arithmetic result of the control unit 100, and the like are temporarily stored.

The storage unit 102 is a computer-readable storage medium which retains programs (including an OS, an application program, a driver program, a utility program, and the like) executed by the control unit 100 and data and is a nonvolatile memory such as an EEPROM or an SSD.

The control unit 100 is, for example, a central processing unit (CPU), a microprocessor, a DSP, or the like and implements various functions by totally controlling the operation of the portable computing device 1. Specifically, the control unit 100 executes instructions included in a program stored in the storage unit 102 while referring to data stored in the storage unit 102 or data loaded into the memory 101 as needed to implement various functions such as a mail function, a web browsing function, a display function, and the like.

Moreover, the control unit 100 detects the state (the basic state, the closed state, the tablet state, the tent state, the book state, or the clamshell state) of the portable computing device 1 on the basis of detection results of the first accelerator sensor 17 and the second accelerator sensor 27.

More specifically, the control unit 100 determines the orientation of the first touch display unit 11 on the basis of the acceleration values $Ax_1(t)$, $Ay_1(t)$, and $Az_1(t)$ in the $X_1Y_1Z_1$ directions output from the first accelerator sensor 17, determines the orientation of the second touch display unit 21 on the basis of the acceleration values $Ax_2(t)$, $Ay_2(t)$, and $Az_2(t)$ in the $X_2Y_2Z_2$ directions output from the second accelerator sensor 27, and discriminates the basic state, the tablet state, the tent state, the book state, the clamshell state, or the closed state on the basis of the orientations of the first touch display unit 11 and the second touch display unit 21.

The control unit 100, the first accelerator sensor 17, and the second accelerator sensor 27 function as state detection means which detects the state of the portable computing device 1. It should be noted that the method of detecting the state of the portable computing device 1 is not limited thereto, but other methods may be used. For example, it is possible to use a magnet element and a hall element for detecting the opening/closing of the chassis, an angle sensor for detecting a rotation angle of the hinge 30, or the like.

As described above, the control unit 100 controls the display function. The control unit 100 changes the orientations of images displayed on the first touch display unit 11 and the second touch display unit 21 according to the detected state of the portable computing device 1. Moreover, the control unit 100 turns off the screen of the first touch display unit 11 or of the second touch display unit 21 if an input operation is not performed on the first touch display unit 11 or the second touch display unit 21 for a predetermined time period (it is also possible to turn off the screen of the display unit 11b or of the display unit 21b with the touch panel 11a or the touch panel 21a kept in an operating state so as to be able to accept an input operation even if the screen of the first touch display unit 11 or the second touch display unit 21 is in the off state). Furthermore, the control unit 100 resumes the information on the display screen in the case of turning off the first touch display unit 11 or the second touch display unit 21 and restores the resumed display screen in the case of turning on the screen again.

For example, similarly to the WINDOWS® OS, the control unit 100 has the EXTENDED DESKTOP function, by which the first touch display unit 11 and the second touch display unit 21 can be set as a primary screen (primary monitor) or a secondary screen (secondary monitor). The user is allowed to set the first touch display unit 11 and the second touch display unit 21 as the primary screen or the secondary screen on a screen (not illustrated) for use in performing environment setting for the EXTENDED DESKTOP, and the control unit 100 is able to set the first touch display unit 11 and the second touch display unit 21 to the primary screen or to the secondary screen according to the contents having been set.

Furthermore, the control unit 100 performs screen state information display processing for displaying screen state information indicating the display state of the screen of at least the other touch display unit on the first touch display unit 11 and the second touch display unit 21. The screen state information may include information indicating turning on and off of the screen. For example, the control unit 100 may display "1" if the screen of the first touch display unit 11 is on, "2" if the screen of the second touch display unit 21 is on, and "0" if the other touch display unit is off on the first touch display unit 11 and the second touch display unit 21.

FIG. 4 is a diagram for describing a display example of screen state information 200. For example, the control unit 100 displays "1" if the screen of the first touch display unit 11 is on or "2" if the screen of the second touch display unit 21 is on. The control unit 100 displays "0" if the other touch display unit displays nothing. For example, as illustrated in FIG. 4, if both of the screen of the first touch display unit 11 and the screen of the second touch display unit 21 are off, the screen state information 200 is not displayed on the first touch display unit 11 and the second touch display unit 21 (S51). If the screen of the first touch display unit 11 is on and the screen of the second touch display unit 21 is off, "1" and "0" are displayed as the screen state information 200 on the first touch display unit 11 (S52). If the screen of the first touch display unit 11 is off and the screen of the second touch display unit 21 is on, "0" and "2" are displayed as the screen state information 200 on the second touch display unit 21 (S53). If both of the screen of the first touch display unit 11 and the screen of the second touch display unit 21 are on, "1" and "2" are displayed as the screen state information 200 on the first touch display unit 11 and the second touch display unit 21 (S54). Although the screen state information may be displayed in any position on the screen, the screen state information may be displayed in a corner position where the screen state information does not disturb the display of other images. Moreover, the control unit 100 may change the display position of the screen state information according to the display direction of the screen.

Furthermore, the screen state information 200 may include information indicating the display content of the screen. For example, the control unit 100 may display "1(Browser)" if a browser screen is displayed or "1(Mail)" if a mail screen is displayed on the first touch display unit 11 and may display "2(Photo)" if a photograph is displayed or "2(Music)" if a music application screen is displayed on the second touch display unit 21.

Moreover, the control unit 100 may perform the screen state information display processing if the rotation angle θ of the second chassis 20 with respect to the first chassis 10 is within the range of 180 degrees<θ≤360 degrees (the tent state or the basic state). In the tent state or the basic state, the user is able to visually recognize only one of the first touch display unit 11 and the second touch display unit 21 and is unable to visually recognize the display state of the other touch display unit in some cases. Therefore, an embodiment enables a user to check the display state of the other touch display unit by viewing one touch display unit, thereby improving the user-friendliness.

Moreover, the control unit 100 performs screen switching processing of switching the screen state of at least one of the first touch display unit 11 and the second touch display unit 21 according to an input operation (for example, a touch input operation including a gesture operation) on at least one of the first touch display unit 11 and the second touch display unit 21.

The switching of the screen state may include at least one of turning on of a screen, turning off of a screen, and display screen switching.

In the screen switching processing, the content of the screen to be switched may be selected on the basis of the number of fingers touching at least one of the first touch display unit 11 and the second touch display unit 21.

Moreover, in screen switching processing, the screen may be switched to the primary screen or the secondary screen on the basis of the number of fingers touching at least one of the first touch display unit 11 and the second touch display unit 21.

Furthermore, in the screen switching processing, the screen may be switched to a screen which is (has been) displayed on the first touch display unit 11 or to a screen which is (has been) displayed on the second touch display unit 21 on the basis of the number of fingers touching at least one of the first touch display unit 11 and the second touch display unit 21.

Further, in the screen switching processing, the same screen may be displayed on the first touch display unit 11 and the second touch display unit 21 in the case where a first input operation has been performed on at least one of the first touch display unit 11 and the second touch display unit 21.

Still further, in the screen switching processing, a two-screen display may be performed on the first touch display unit 11 and the second touch display unit 21 in the case where a second input operation has been performed on at least one of the first touch display unit 11 and the second touch display unit 21.

Figure 5A:
FIG. 5A is a diagram illustrating a matrix for describing an example of screen switching processing.
Figure 7:
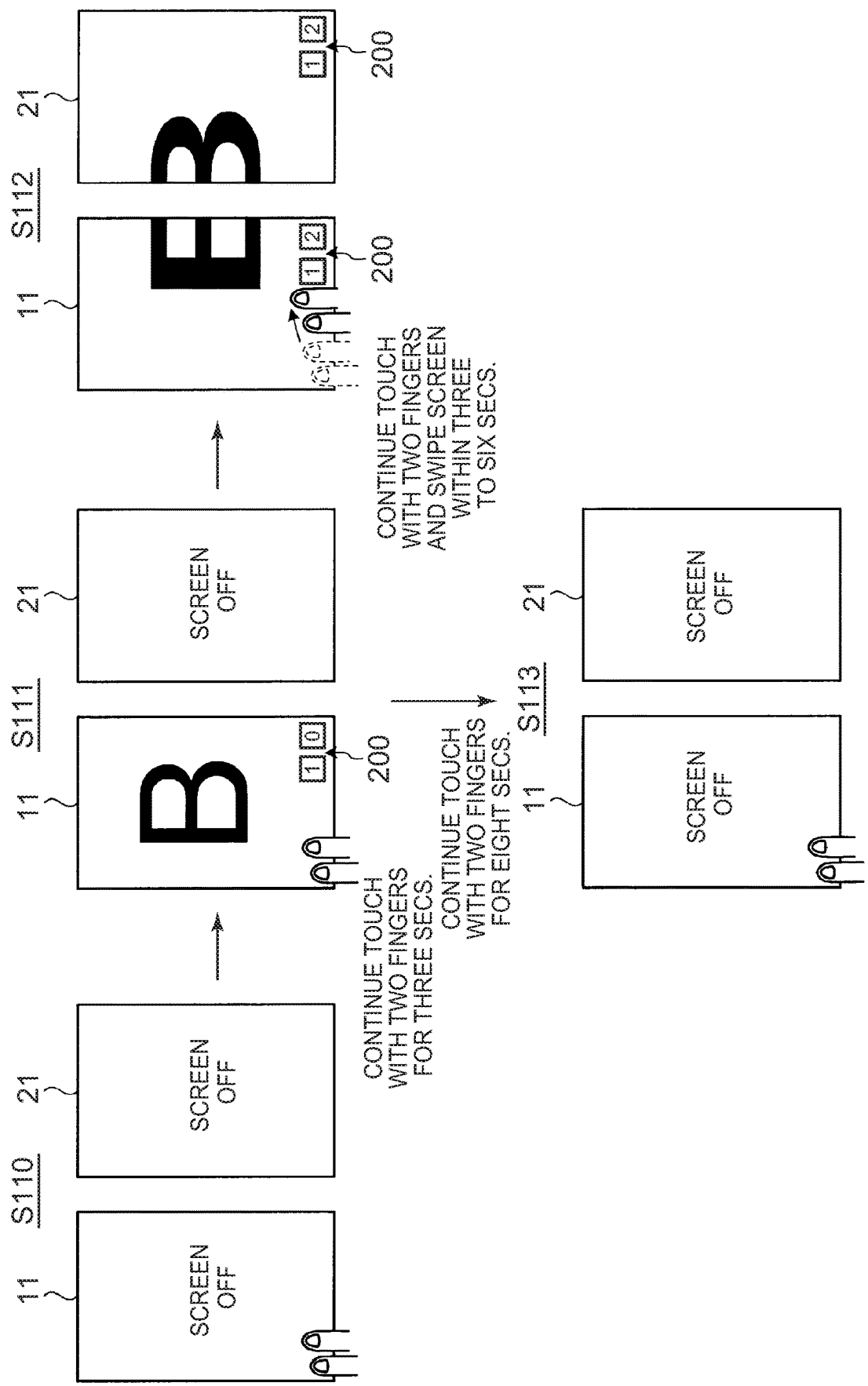
FIG. 7 is a diagram for describing an example of a user's operation and an example of screen displays for the screen switching processing.
Figure 8:
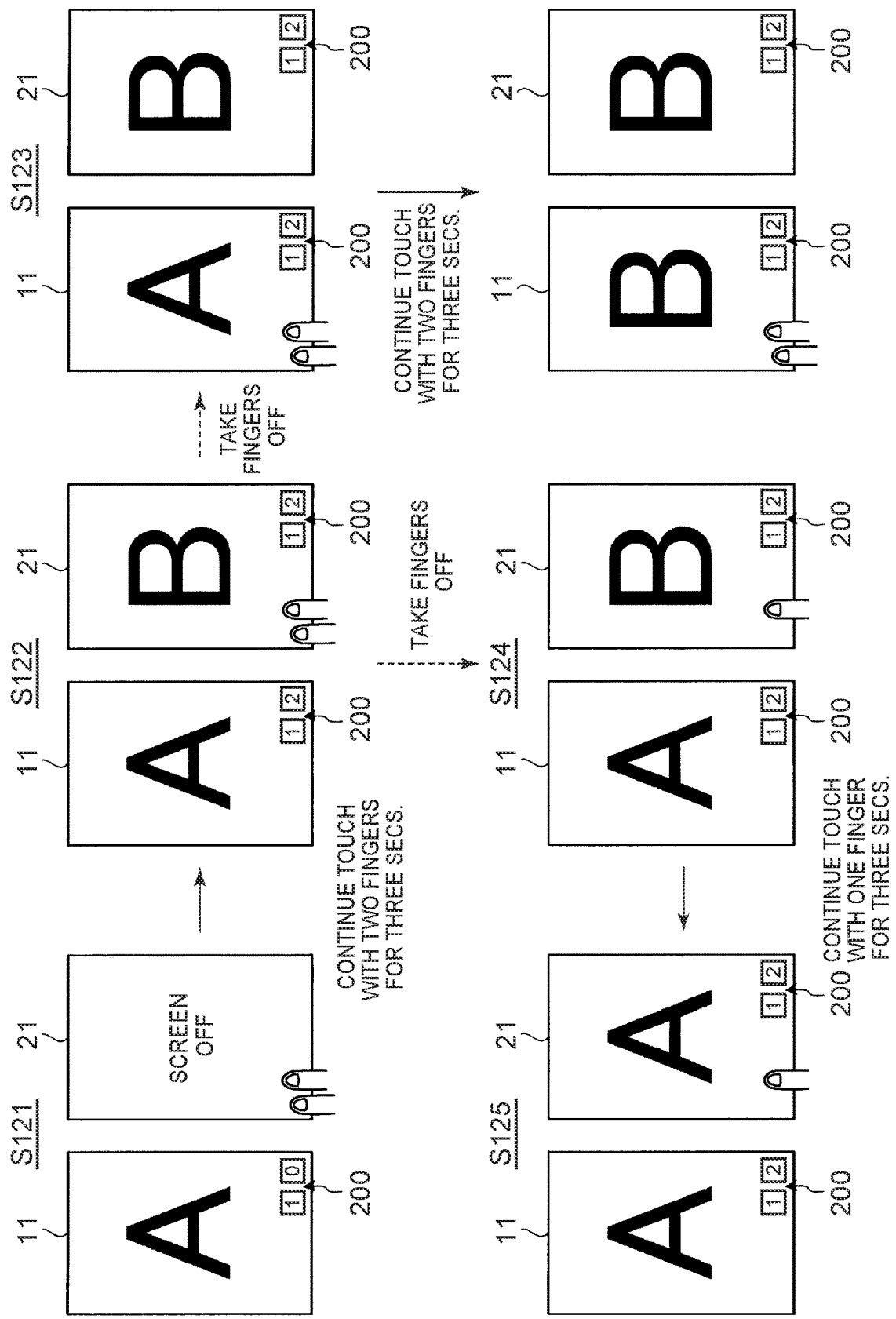
FIG. 8 is a diagram for describing an example of a user's operation and an example of screen displays for the screen switching processing.

FIGS. 5A and 5B are diagrams illustrating a matrix for describing an example of the screen switching processing. FIGS. 6 to 8 are diagrams each for describing an example of a user's operation and an example of screen displays for the screen switching processing.

The control unit 100 retains data illustrated in the matrix in FIGS. 5A and 5B as a table and performs the screen switching processing according to the table when an input operation is performed.

Defining the matrix by (row X, column Y) in FIGS. 5A and 5B, the vertical axis $(X_1,0)$ to $(X_{11},0)$ indicates the state of the screen before the input operation is performed on the first touch display unit 11 and on the second touch display unit 21 and the horizontal axis $(0,Y_1)$ to $(0,Y_{11})$ indicates the state of the screen after the input operation is performed within the matrix on the first touch display unit 11 and on the second touch display unit 21.

The state where none is described in the screen of the first touch display unit 11 and in the screen of the second touch display unit 21 indicates that the screens are off, the state where A is described indicates that the primary screen is displayed, and the state where B is described indicates that the secondary screen is displayed.

For example, $(X_1,0)$ and $(0,Y_1)$ each indicates a state where the screen of the first touch display unit 11 and the screen of the second touch display unit 21 are off, $(X_2,0)$ and $(0,Y_2)$ each indicates a state where the primary screen is displayed on the first touch display unit 11 and the screen of the second touch display unit 21 is off, $(X_3,0)$ and $(0,Y_3)$ each indicates a state where the primary screen is displayed on the first touch display unit 11 and on the second touch display unit 21 (a state where the same screen is displayed), ($X_7$,0) and (0,$Y_7$) each indicates a state where the primary screen is displayed across the two screens of the first touch display unit 11 and the second touch display unit, and ($X_{11}$,0) and (0,$Y_{11}$) each indicates a state where the secondary screen is displayed across the two screens of the first touch display unit 11 and the second touch display unit 21.

Each of the numerals "1," "2," and "0" within the matrix indicates the number of touching fingers: "1" indicates a touch with one finger; "2" indicates a touch with two fingers; and "0" indicates a touch with no finger (which means no touch) and a touch with three or more fingers. The touch with one finger "1" is for use in selecting the primary screen and the touch with two fingers "2" is for use in selecting the secondary screen. In the screen switching processing, the state of the current screen is maintained in the case of the touch with no finger and with three or more fingers "0."

Moreover, "L" (Long) indicates that a touch is continued for a first predetermined time period (for example, three seconds), "VL" (Very Long) indicates that a touch is continued for a third predetermined time period (for example, eight seconds), and "LS" (Long Swipe) indicates that a touch is continued and a swipe operation is performed within a second predetermined time period (for example, three to six seconds) in the touched state (a swipe operation performed within three to six seconds after starting the touch).

For example, to perform switching from the screen of ($X_5$,0) to the screen of (0,$Y_4$), a touch with one finger is continued on the first touch display unit 11 for three seconds ("1, L") and a touch with two fingers is continued on the second touch display unit 21 for three seconds ("2, L").

More specifically, if a touch with one finger is continued for the first predetermined time period (for example, three seconds) ("1, L"), the following is performed: (1) the primary screen (A) is displayed if the screen is off, the screen is switched to the primary screen (A) if the screen is on and the secondary screen (B) is displayed, or the primary screen (A) is maintained if the screen is on and the primary screen (A) is displayed; (2) if the touch is continued and a swipe operation is performed within the second predetermined time period (for example, three to six seconds) ("1, LS"), the primary screen (A) is displayed across the two screens along with the other touch display unit; and (3) if the touch with one finger is continued for the third predetermined time period (for example, eight seconds) ("1, VL"), the screen is turned off.

Referring to FIG. 6, the touch operation with one finger and the two-screen display will be described by giving an example. For example, as illustrated in FIG. 6, if a touch operation with one finger is continued for three seconds on the first touch display unit 11 in the case where the first touch display unit 11 and the second touch display unit 21 are off (S100), the control unit 100 displays the primary screen on the first touch display unit 11 and displays the screen state information 200 ("1" indicating that the screen of the first touch display unit 11 is on and "0" indicating that the screen of the second touch display unit 21 is off) (S101). If a swipe operation is performed within three to six seconds in the touched state with the touch operation with one finger continued, the control unit 100 turns on the screen of the second touch display unit 21 and displays the primary screen across the two screens of the first touch display unit 11 and the second touch display unit 21. Moreover, the control unit 100 updates the screen state information 200 of the first touch display unit 11 (updates the information to "2" indicating that the second touch display unit 21 is on) and displays the screen state information 200 ("1" indicating that the screen of the first touch display unit 11 is on and "2" indicating that the second touch display unit 21 is on) on the second touch display unit 21 (S102). On the other hand, after the touch operation with one finger is continued for eight seconds, the control unit 100 turns off the screen of the first touch display unit 11 (S103).

Moreover, if a touch with two fingers is continued for the first predetermined time period (for example, three seconds) ("2, L") in FIGS. 5A and 5B, the following is performed: (1) the secondary screen (B) is displayed if the screen is off, (2) the screen is switched to the secondary screen (B) if the screen is on and the primary screen (A) is displayed, or the secondary screen(B) is maintained if the screen is on and the secondary screen (B) is displayed; (2) if a swipe operation is performed within the second predetermined time period (for example, three to six seconds) in the touched state with the touch continued ("2, LS"), the secondary screen is displayed across the two screens along with the other touch display unit; and (3) if the touch operation is continued for the third predetermined time period (for example, eight seconds) ("2, VL"), the screen is turned off.

Referring to FIG. 7, the touch operation with two fingers and the two-screen display will be described by giving an example. For example, as illustrated in FIG. 7, if a touch operation with two fingers is continued for three seconds on the first touch display unit 11 in the case where the first touch display unit 11 and the second touch display unit 21 are off (S110), the control unit 100 displays the secondary screen on the first touch display unit 11 and displays the screen state information 200 ("1" indicating that the screen of the first touch display unit 11 is on and "0" indicating that the screen of the second touch display unit 21 is off) (S111). If a swipe operation is performed within three to six seconds in the touched state with the touch operation with two fingers continued, the control unit 100 turns on the screen of the second touch display unit 21 and displays the secondary screen across the two screens of the first touch display unit 11 and the second touch display unit 21. Moreover, the control unit 100 updates the screen state information 200 of the first touch display unit 11 (updates the information to "2" indicating that the second touch display unit 21 is on) and displays the screen state information 200 ("1" indicating that the screen of the first touch display unit 11 is on and "2" indicating that the second touch display unit 21 is on) on the second touch display unit 21 (S112). On the other hand, after the touch operation with two fingers is continued for eight seconds, the control unit 100 turns off the screen of the first touch display unit 11 (S113).

Referring to FIG. 8, a touch operation for displaying the same screen on the first touch display unit 11 and the second touch display unit 21 will be described by giving an example. For example, as illustrated in FIG. 8, if a touch operation with two fingers is continued for three seconds on the second touch display unit 21 in the case where the primary screen ("1" and "0" of the screen state information 200) is displayed on the first touch display unit 11 and the second touch display unit 21 is off (S121), the control unit 100 displays the secondary screen on the second touch display unit 21 and displays "1" and "2" of the screen state information 200 and updates the screen state information 200 displayed on the first touch display unit 11 to "1" and "2" (S122). It is assumed here that the user takes the two fingers off the second touch display unit 21 once.

If the first touch display unit 11 is touched with two fingers as illustrated in S123 and the touch is continued for three seconds, the control unit 100 displays the secondary screen on the first touch display unit 11 as illustrated in S126, by which the secondary screen is displayed on the first touch display unit 11 and the second touch display unit 21.

Moreover, if the second touch display unit 21 is touched with one finger and the touch is continued for three seconds as illustrated in S124, the control unit 100 displays the primary screen on the second touch display unit 21 as illustrated in S125, by which the primary screen is displayed on the first touch display unit 11 and the second touch display unit 21.

Figure 9:
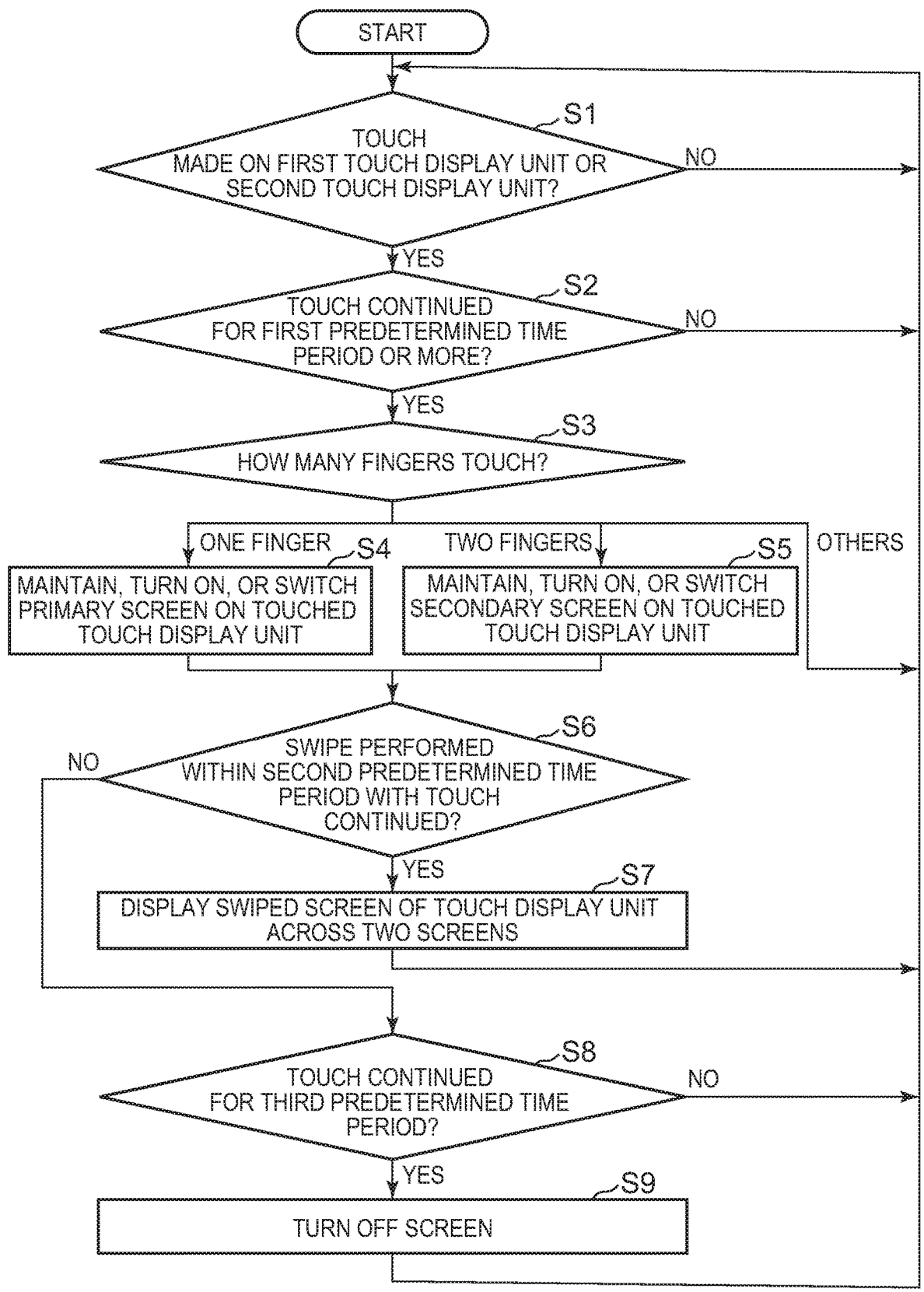
FIG. 9 is a flowchart for describing an example of screen switching processing and screen state information display processing performed by a control unit.

FIG. 9 is a flowchart for describing an example of screen switching processing and screen state information display processing performed by the control unit 100.

In FIG. 9, the control unit 100 determines whether or not a touch was made on the first touch display unit 11 or on the second touch display unit 21 (step S1). If the touch was made on the first touch display unit 11 or on the second touch display unit 21 ("Yes" in step S1), the control unit 100 determines whether or not the touch is continued for the first predetermined time period (for example, three seconds) or more (step S2). Unless the touch is continued for the first predetermined time period (for example, three seconds) or more ("No" in step S2), the control unit 100 returns to step S1. On the other hand, if the touch is continued for the first predetermined time period or more ("Yes" in step S2), the control unit 100 determines the number of fingers having touched the screen (step S3).

If the number of fingers having touched the touch display unit is two in step S3, the control unit 100 maintains, turns on, or switches the secondary screen on the touched touch display unit (step S5). Specifically, the control unit 100 maintains the display of the secondary screen if the secondary screen is displayed, turns on the screen to display the secondary screen if the screen is off, or switches the display to the secondary screen if the primary screen is displayed. When turning on the screen, the control unit 100 displays screen display state information on the touch display unit on which the screen is to be turned on and updates the screen state information displayed on the other touch display unit.

On the other hand, if the number of fingers having touched the touch display unit is other than the above in step S3, the control unit 100 returns to step S1.

In step S6, the control unit 100 determines whether or not a swipe was performed within the second predetermined time period (for example, three to six seconds after starting the touch) with the touch continued. If the swipe was performed within the second predetermined time period with the touch continued ("Yes" in step S6), the control unit 100 displays the swiped screen across the two screens (step S7) and returns to step S1. Meanwhile, unless the swipe was performed within the second predetermined time period with the touch continued, the control unit 100 proceeds to step S8.

In step S8, the control unit 100 determines whether or not the touch is continued for the third predetermined time period (for example, eight seconds) (step S8). Unless the touch is continued for the third predetermined time period (for example, eight seconds) ("No" in step S8), the control unit 100 returns to step S1. If the touch is continued for the third predetermined time period (for example, eight seconds) ("Yes" in step S8), the control unit 100 turns off the screen of the touch display unit having been touched (step S9). Moreover, when turning off the screen, the control unit 100 updates the screen state information displayed on the other touch display unit.

The operation of turning off the screen is performed not only after the touch is continued for the third predetermined time period. It is also possible to turn off the screen at the occurrence of another touch operation. For example, if a tap operation was performed a predetermined number of times within the predetermined time period on the screen, the control unit 100 may turn off the screen concerned.

Furthermore, although the screen has been switched to the primary screen or to the secondary screen on the basis of the number of touching fingers, the embodiments are not limited thereto. The display may be switched to the screen which is (has been) displayed on the first touch display unit 11 or to the screen which is (has been) displayed on the second touch display unit 21 on the basis of the number of touching fingers.

Moreover, the operation for performing two-screen display is not limited to the swipe operation performed within the second predetermined time period with the touch continued, but the two-screen display may be performed in the case where another touch operation was performed. For example, the control unit 100 may perform the two-screen display if a touch operation of drawing "2" was performed.

(Variation 1)

In the aforementioned screen switching processing, the control unit 100 may display the same screen on the first touch display unit 11 and the second touch display unit 21 if the same predetermined operation is performed substantially simultaneously on the first touch display unit 11 and the second touch display unit 21. For example, if the first touch display unit 11 and the second touch display unit 21 are tapped twice with one finger substantially simultaneously, the control unit 100 may display the same screen as the screen of the first touch display unit 11 on the second touch display unit 21. Furthermore, if the first touch display unit 11 and the second touch display unit 21 are tapped twice with two fingers substantially simultaneously, the control unit 100 may display the same screen as the screen of the second touch display unit 21 on the first touch display unit 11.

Figure 10:
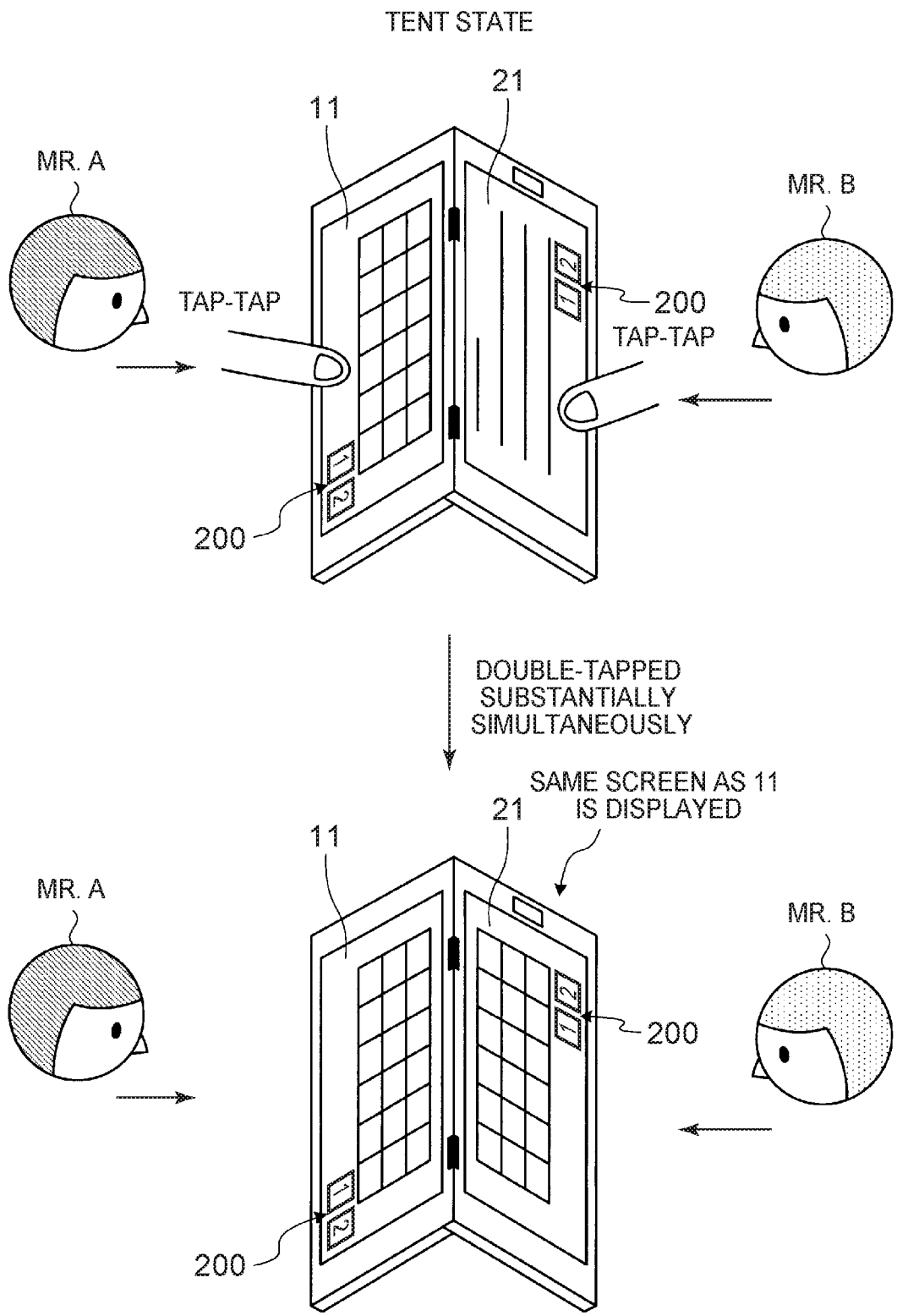
FIG. 10 is a diagram for describing another example of screen switching processing.

FIG. 10 is a diagram for describing another example of the screen switching processing. FIG. 10 illustrates the tent state of the portable computing device 1. In FIG. 10, Mr. A is able to visually recognize the screen of the first touch display unit 11, but unable to visually recognize the screen of the second touch display unit 21 directly. On the other hand, Mr. B is able to visually recognize the screen of the second touch display unit 21, but unable to visually recognize the screen of the first touch display unit 11 directly. In this case, for example, if it is required for Mr. B to view the same screen as that of Mr. A, as illustrated in FIG. 10, Mr. A and Mr. B tap the first touch display unit 11 and the second touch display unit 21, respectively, substantially simultaneously twice with one finger, by which the same screen as the first touch display unit 11 is displayed on the second touch display unit 21. On the other hand, if it is required for Mr. A to view the same screen as that of Mr. B, Mr. A and Mr. B tap the first touch display unit 11 and the second touch display unit 21, respectively, substantially simultaneously twice with two fingers, by which the same screen as the second touch display unit 21 is displayed on the first touch display unit 11 (not illustrated).

(Variation 2)

If the portable computing device 1 is gripped by hand (one hand or both hands), the control unit 100 may omit the execution of the aforementioned screen switching processing. The aim thereof is to prevent screen switching from being performed against user's intention since, in the state where the user grips the portable computing device 1 by hand, the user's finger (or fingers) touches the touch display unit for a predetermined time period or more in some cases. As a method of detecting gripping by the user, it is possible to use various methods such as, for example, a method of detecting the gripping by detecting contact of a hand with a contact sensor by providing the contact sensor on the chassis disposed around the touch display unit, a method of detecting the gripping by detecting a touch on a boundary portion between the touch display unit and the chassis, a method of detecting the gripping in the case where a contact area to the touch display unit is equal to or greater than a predetermined value, a method of a combination of these methods, and a method of determining that the user grips the portable computing device 1 if a state of detection by at least one of these methods has continued for a predetermined time period or more.

Moreover, the control unit 100 may omit the execution of the above screen switching processing in the case where the portable computing device 1 is gripped by hand (one hand or both hands) in a state where the rotation angle θ of the second chassis 20 with respect to the first chassis 10 satisfies 180 degrees<θ≤360 degrees (the tent state, the basic state).

Figure 11A:
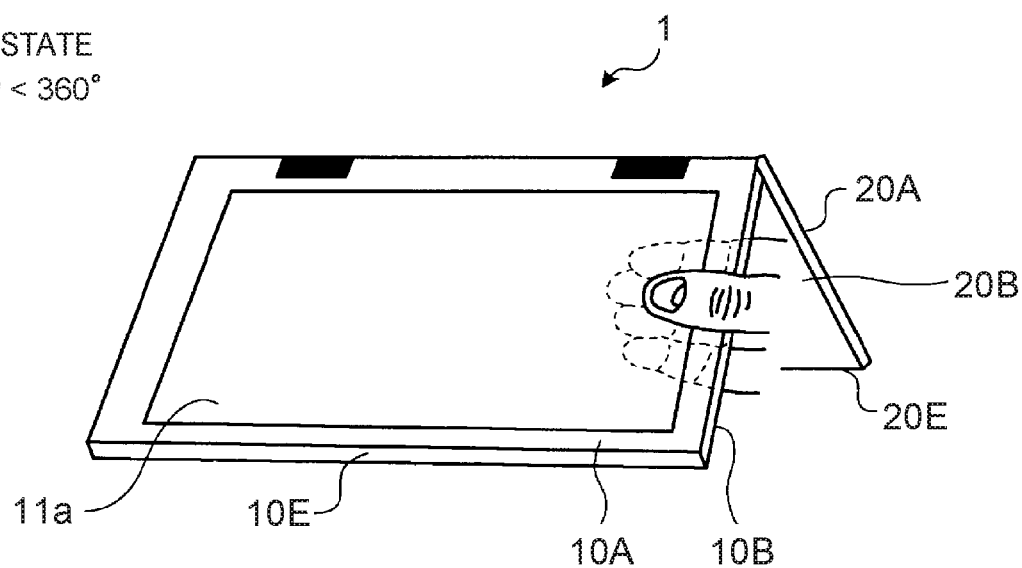
FIG. 11A is a diagram for describing a state where the portable computing device is gripped by hand (in the case of the tent state).
Figure 11B:
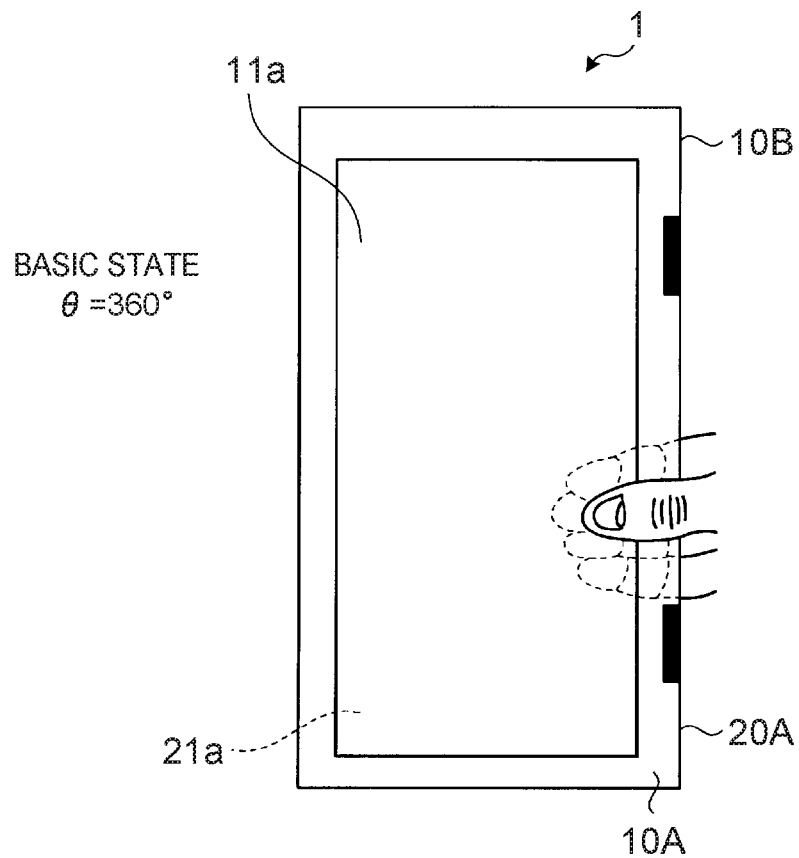
FIG. 11B is a diagram for describing a state where the portable computing device is gripped by hand (in the case of the basic state).

FIGS. 11A and 11B are diagrams each for describing a state where the portable computing device 1 is gripped by hand. The example in each of FIGS. 11A and 11B illustrates a state where the portable computing device 1 (the tent state, the basic state) is gripped by one hand with a thumb on the front surface side and with remaining fingers (two to four fingers) on the back surface side. In FIG. 11A, the thumb is in contact with the first touch display unit 11a and the first surface 10A of the first chassis 10 in the tent state and the remaining fingers (two to four fingers) are in contact with the second surface 10B of the first chassis 10. In this state, the thumb (one finger) is likely to be in contact with the first touch display unit 11a for the predetermined time period or more. Therefore, as described above, desirably the screen switching processing is not performed. This is not limited to the example of FIG. 11A. Also in a state where the thumb is in contact with the second surface 20B of the second chassis 20 and the remaining fingers (two to four fingers) are in contact with the second touch display unit 21a and the first surface 20A of the second chassis 20 in the tent state, the same is likely to occur and therefore desirably the screen switching processing is not performed as described above.

In FIG. 11B, the thumb is in contact with the first touch display unit 11a and the first surface 10A of the first chassis 10 and remaining fingers (two to four fingers) are in contact with the second touch display unit 21a and the first surface 20A of the second chassis 20 in the basic state. In this state, the thumb (one finger) is likely to be in contact with the first touch display unit 11a and the remaining fingers (two to four fingers) are in contact with the second touch display unit 21a for the predetermined time period or more. Therefore, as described above, desirably the screen switching processing is not performed.

The control unit 100 may be configured to omit the execution of the aforementioned screen switching processing by determining that the portable computing device 1 is gripped by hand, for example, in the case where a state in which one touch display unit is touched with one finger and the other touch display unit is touched with two to four fingers has continued for the predetermined time period.

As described hereinabove, according to the present embodiment, the control unit 100 is configured to perform the screen state information display processing of displaying screen state information indicating the display state of the screen of at least the other touch display unit on the first touch display unit 11 and on the second touch display unit 21, and therefore the user is able to know the display state of the screen of the other touch display unit only by viewing one touch display unit, thereby improving the usability of the two screens.

Furthermore, according to an embodiment, the screen state information includes information indicating turning on and off of the screen, thereby enabling the user to know the on/off state of the screen of the other touch display unit only by viewing one touch display unit.

Furthermore, according to an embodiment, the screen state information includes information indicating the display content of the screen, thereby enabling the user to know what is displayed on the screen of the other touch display unit only by viewing one touch display unit.

Furthermore, according to an embodiment, the control unit 100 is configured to perform the screen state information display processing in the case where the rotation angle θ of the second chassis 20 with respect to the first chassis 10 satisfies 180 degrees<θ≤360 degrees (the tent state, the basic state), thereby enabling the user to check the display state of the screen of the other touch display unit even in the case where the user is only able to directly and visually recognize one touch display unit.

Furthermore, according to an embodiment, the control unit 100 is configured to perform the screen switching processing of switching the screen of at least one of the first touch display unit 11 and the second touch display unit 21 depending on an input operation on at least one of the first touch display unit 11 and the second touch display unit 21. Therefore, the user is able to switch the screen by a simple operation in the portable computing device with two screens, thereby improving the usability of the two screens.

Furthermore, according to an embodiment, the switching of the screen state includes at least one of turning on of a screen, turning off of a screen, and display screen switching. Therefore, the user is able to perform at least one of the switching operations, namely turning on of a screen, turning off of a screen, and display screen switching by a simple operation.

Furthermore, according to an embodiment, the content of the screen to be switched is selected on the basis of the number of fingers touching at least one of the first touch display unit 11 and the second touch display unit 21 in the screen switching processing. Therefore, the user is able to select the content of the screen to be switched on the basis of the number of touching fingers.

Furthermore, according to an embodiment, the display is switched to the primary screen or to the secondary screen on the basis of the number of fingers touching at least one of the first touch display unit 11 and the second touch display unit 21 in the screen switching processing. Therefore, the user is able to switch the display to the primary screen or to the secondary screen on the basis of the number of touching fingers.

Furthermore, according to an embodiment, the display is switched to the screen which is (has been) displayed on the first touch display unit 11 or to the screen which is (has been) displayed on the second touch display unit 21 on the basis of the number of fingers touching at least one of the first touch display unit 11 and the second touch display unit 21 in the screen switching processing. Therefore, the user is able to switch the display to the screen which is (has been) displayed on the first touch display unit 11 or to the screen which is (has been) displayed on the second touch display unit 21 on the basis of the number of touching fingers.

Furthermore, according to an embodiment, in the case where the first input operation is performed on at least one of the first touch display unit 11 and the second touch display unit 21, the same screen is displayed on the first touch display unit 11 and the second touch display unit 21 in the screen switching processing. Therefore, the user is able to display the same screen by a simple operation.

Furthermore, according to an embodiment, in the case where the second input operation is performed on at least one of the first touch display unit 11 and the second touch display unit 21, the two-screen display is performed on the first touch display unit 11 and the second touch display unit 21 in the screen switching processing. Therefore, the user is able to perform the two-screen display on the first touch display unit 11 and the second touch display unit 21 by a simple operation.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A portable computing device comprising:
a first chassis provided with a first touch display unit;
a second chassis provided with a second touch display unit;
a coupling part which rotatably couples the first chassis and the second chassis to each other; and
a control unit which displays screen state information indicating a power state and a content identifier of the first touch display unit and the second touch display unit on both of the touch display units;
wherein the power state for each of the first touch display unit and the second touch display unit indicates an on/off status of the first touch display unit and the second touch display unit;
wherein the power state is represented by a symbol and wherein the content identifier corresponds to a word indicating an application type for a currently displayed application;
wherein the symbol representing the power state for the first touch display unit is different than the symbol representing the power state for the second touch display unit;
wherein the content identifier on each of the first touch display unit and the second touch display unit indicates the application type for the currently displayed application on the opposite display unit.

2. The portable computing device according to claim 1, wherein the control unit displays the screen state information where an angle θ of the second chassis with respect to the first chassis satisfies 180 degrees<θ≤360 degrees.

3. The portable computing device according to claim 1, wherein the screen state information includes information indicating turning on and off of the screen.

4. The portable computing device according to claim 1, wherein the screen state information includes information indicating a display content of the screen.

5. The portable computing device according to claim 1, wherein the control unit switches the state of the screen of at least one of the first touch display unit and the second touch display unit according to an input operation on at least one of the first touch display unit and the second touch display unit.

6. The portable computing device according to claim 5, wherein the switching of the state of the screen includes an action selected from the group consisting of turning on of a display unit, turning off of a display unit, and display unit switching.

7. The portable computing device according to claim 6, wherein the control unit selects the content of a display unit to be switched based on the number of fingers touching at least one of the first touch display unit and the second touch display unit.

8. The portable computing device according to claim 7, wherein the control unit switches the display to a primary display unit or a secondary display unit based on the number of fingers touching at least one of the first touch display unit and the second touch display unit.

9. The portable computing device according to claim 7, wherein the control unit switches to one of the display to the screen displayed on the first touch display unit and to the screen displayed on the second touch display unit based on the number of fingers touching at least one of the first touch display unit and the second touch display unit.

10. The portable computing device according to claim 6, wherein the control unit displays the same content on the first touch display unit and the second touch display unit in the case where a first input operation is performed on at least one of the first touch display unit and the second touch display unit.

11. The portable computing device according claim 6, wherein the control unit performs two-screen display on the first touch display unit and the second touch display unit in the case where a second input operation is performed on one or more of the first touch display unit and the second touch display unit.

12. A method, comprising:
displaying screen state information for a portable computing device in which a first chassis provided with a first touch display unit is rotatably coupled to a second chassis provided with a second touch display unit; and
indicating a power state and a content identifier of the first touch display unit and the second touch display unit on both of the touch display units;
wherein the power state for each of the first touch display unit and the second touch display unit indicates an on/off status of the first touch display unit and the second touch display unit;
wherein the power state is represented by a symbol and wherein the content identifier corresponds to a word indicating an application type for a currently displayed application;
wherein the symbol representing the power state for the first touch display unit is different than the symbol representing the power state for the second touch display unit;
wherein the content identifier on each of the first touch display unit and the second touch display unit indicates the application type for the currently displayed application on the opposite display unit.

13. The method according to claim 12, further comprising switching the state of at least one of the first touch display unit and the second touch display unit according to an input operation on at least one of the first touch display unit and the second touch display unit.

14. A computer program product, comprising:
a computer readable storage device storing code that is executable by a processor and comprises:
code that displays screen state information for a portable computing device in which a first chassis provided with a first touch display unit is rotatably coupled to a second chassis provided with a second touch display unit; and
code that indicates a power state and a content identifier of the first touch display unit and the second touch display unit on both of the touch display units;
wherein the power state for each of the first touch display unit and the second touch display unit indicates an on/off status of the first touch display unit and the second touch display unit;
wherein the power state is represented by a symbol and wherein the content identifier corresponds to a word indicating an application type for a currently displayed application;
wherein the symbol representing the power state for the first touch display unit is different than the symbol representing the power state for the second touch display unit;
wherein the content identifier on each of the first touch display unit and the second touch display unit indicates the application type for the currently displayed application on the opposite display unit.

15. The computer program product according to claim 14, further comprising code that switches the state of at least one of the first touch display unit and the second touch display unit according to an input operation on at least one of the first touch display unit and the second touch display unit.

16. The computer program product according to claim 15, wherein the code that indicates comprises code that displays the screen state information where an angle θ of the second chassis with respect to the first chassis satisfies 180 degrees<θ≤360 degrees.

17. The computer program product according to claim 14, wherein the screen state information includes information indicating turning on and off of the screen.

18. The computer program product according to claim 14, wherein the screen state information includes information indicating a display content of the screen.

19. The computer program product according to claim 15, wherein the code that switches comprises code that performs an action selected from the group consisting of turning on of the a display unit, turning off of display unit, and display unit switching.

20. The computer program product according to claim 19, wherein the control unit selects content of a display unit to be switched based on the number of fingers touching at least one of the first touch display unit and the second touch display unit.

* * * * *